UNITED STATES PATENT OFFICE.

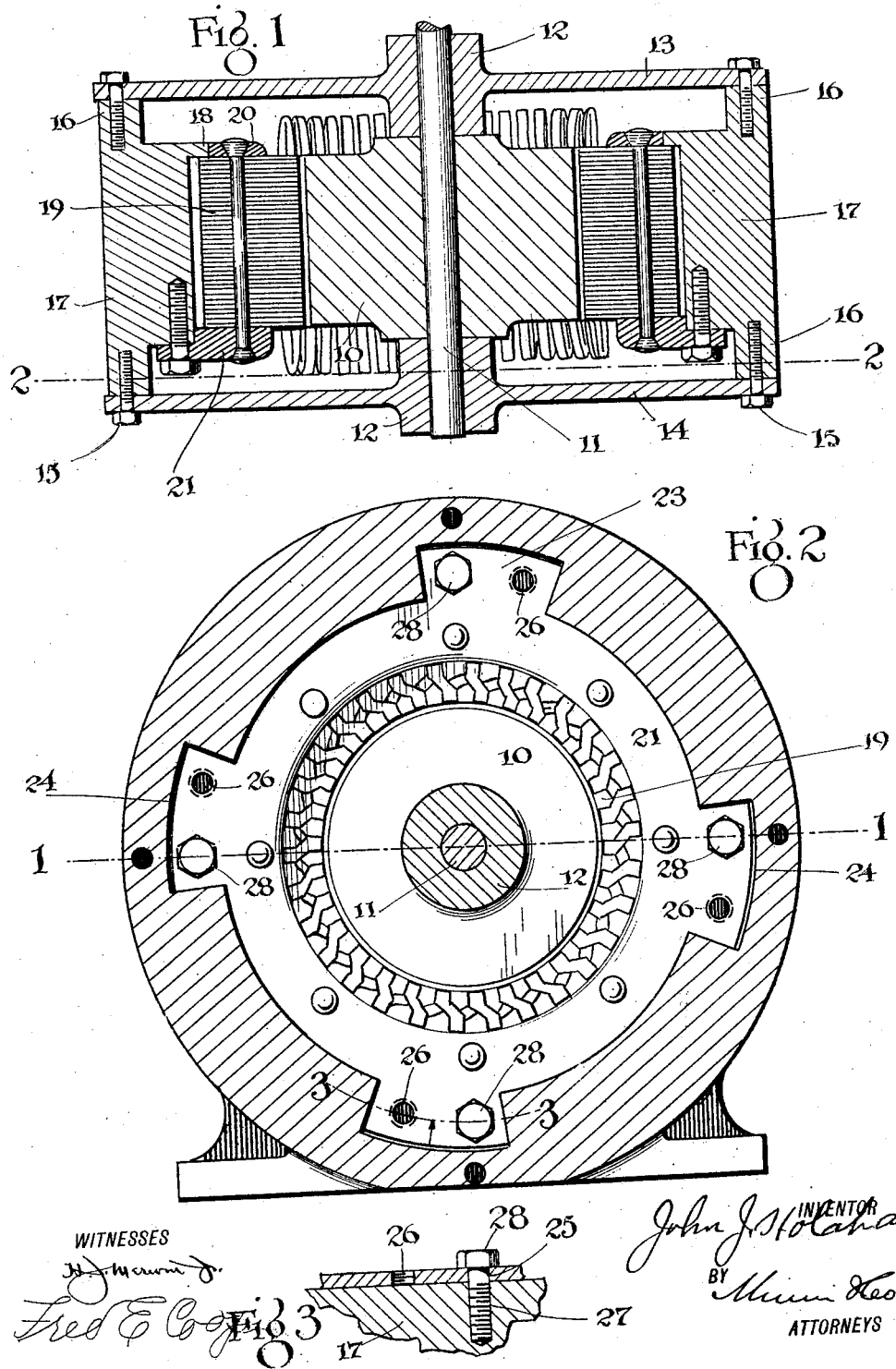

JOHN JOSEPH HOLAHAN, OF NORFOLK, VIRGINIA.

MECHANICAL CONSTRUCTION OF ELECTRICAL MOTORS.

1,415,564. Specification of Letters Patent. Patented May 9, 1922.

Application filed November 2, 1920. Serial No. 421,309.

*To all whom it may concern:*

Be it known that I, JOHN JOSEPH HOLAHAN, a citizen of the United States, and a resident of Norfolk, in the county of Norfolk and State of Virginia, have invented certain new and useful Improvements in Mechanical Constructions of Electrical Motors, of which the following is a specification.

My invention relates generally to electrical motors and other electrical apparatus involving wound stators, and more particularly to the mechanical construction of induction motors, my object being the provision of an arrangement wherein the stator may be removed without dismantling the motor in order to replace burned out coils or core.

A further object is the provision of a simple construction and means whereby the stator may be seated and unseated without the use of special tools and implements, and without requiring particular skill beyond normal care and attention.

In the accompanying drawing illustrating my present invention and forming a part of this specification, and wherein the electrical connections and parts such as coils, wires and similar features have been purposely omitted in order to illustrate the invention to best advantage, Figure 1 is a horizontal section taken substantially on line 1—1 of Figure 2, Figure 2 is a vertical section taken on line 2—2 of Figure 1, and Figure 3 is a detail section taken on line 3—3 of Figure 2.

Referring now to these figures I have purposely shown the mechanical skeleton of an induction motor, the rotor 10 of which is seen mounted upon a shaft 11 having bearing through the central hubs 12 of side plates 13 and 14, each of which is bolted around its outer edge by bolts 15 to the respective annular rim 16 of the circular frame 17.

The frame 17 has its inner periphery extending inwardly beyond and between its rim portions 16, coaxially with and around the shaft 11 and is provided with an inner annular flange 18 at one side against which the stator 19 abuts at one side. This stator which may be of any suitable form in so far as the support of the usual coils 19ª is concerned, is of reduced diameter as compared to the inner periphery of the frame and has side rings 20 and 21 secured to opposite sides thereof, the former of which seats within the inner annular flange 18. The other ring 21 is adapted to interfit the frame and is provided at spaced points therearound with outwardly projecting wings 23, each wing being adapted to enter a conformable frame side recess 24 and having a pair of circumferentially spaced openings 25 and 26. Each of the openings 25 is arranged opposite a threaded lateral opening 27 of the frame 17, and is unthreaded to receive therethrough a bolt 28, the several bolts being utilized to screw into the frame openings and force the stator 19 inwardly to surround the rotor 10 and seat its ring 20 within the flange 18 of the frame 17.

The other openings 26 are threaded to receive the bolts 28 so that by detaching the latter by unscrewing the same from the frame 17, they may be screwed into the threaded openings 26 of the ring 21 in the removal of the stator when this becomes desirable or necessary.

Thus with the parts in the position shown in Figures 1 and 2 and for removal of the stator without dismantling the other parts, it is simply necessary to release and unscrew the bolts 15 of the side plate 14 in order to remove the latter from the adjacent end of the shaft 11. After this has been done the inner connecting bolts 28 of the stator ring 21 are unscrewed from the frame 17 and, upon their removal, are screwed into the openings 26 with their inner ends bearing against solid portions of the frame 17. Thus with the bearing these screws have against the frame it becomes obvious it is only necessary to screw the bolts inwardly in order to force the stator axially with respect to the rotor and the frame sufficiently to unseat the ring 20 in order to effect release of the stator from the frame. When the stator has thus been released and the repairs to, or substitution of, the worn or damaged parts have been effected, the screws 28 are removed from the threaded openings 26 and after the stator has been placed within the frame and around the rotor, with the wings 23 of its ring 21 within the frame openings 24, the bolts or screws 28 are disposed in the frame openings 27 through the wing openings 25 so that by screwing the bolts or screws inwardly the stator will be forced inwardly to the normal effective position thereof as shown in Figure 1.

My invention thus provides for the ready easy removal of the stator without dismantling the motor, for purposes of substitution as well as repair, and affords a simple solution of this problem without requiring the use of special implements or tools and without necessitating particular skill beyond ordinary care and attention.

I claim:

1. A motor including a stator, a frame having an inner seat for the stator on and off of which the latter is shiftable parallel to the axis of the rotor, and also having a removable side plate, and means for shifting the stator on to and off its seat, said means extending through portions of the stator and adapted for connection with the frame as described.

2. A motor including an axially shiftable stator, a frame in which the stator is carried, said stator including a side ring having radially projecting wings, and means working through the said wings and engaging portions of the frame for shifting the stator in relatively opposite directions.

3. A motor including an axially shiftable stator, a frame in which the stator is carried, said stator including a side ring having radially projecting wings, and means working through the said wings and engaging portions of the frame for shifting the stator in relatively opposite directions, said last named means serving to normally secure the stator to the frame as described.

4. A motor including a frame having an inner annular stator seat and provided with slots around the same at one side, a stator seated on the said seat and having side rings, one of which is provided with outstanding wings, each wing provided with a pair of openings, one of which is threaded and the other unthreaded, and clamping bolts extending through the unthreaded openings of the stator and into threaded sockets in the frame, and also engageable within the threaded openings of the wings against solid portions of the frame as described.

5. A motor including a frame provided with slots around the same at one side, a stator seated in the said frame and having side rings, one of which is provided with outstanding wings, each wing provided with a pair of openings, one of which is threaded and the other unthreaded, and clamping bolts extending through the unthreaded openings of the stator and into threaded sockets in the frame, and also engageable within the threaded openings of the wings against solid portions of the frame, said frame having an inner annular flange therearound at one side cooperating with one of the side rings of the stator and forming a seat for the stator as described.

JOHN JOSEPH HOLAHAN.